(12) United States Patent
Miller

(10) Patent No.: US 6,260,925 B1
(45) Date of Patent: *Jul. 17, 2001

(54) UNIVERSAL MOUNTING PAN FOR CHILD SEAT

(75) Inventor: Peter E. Miller, Noblesville, IN (US)

(73) Assignee: Indiana Mills & Manufacturing, Inc., Westfield, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/136,099

(22) Filed: Aug. 18, 1998

(51) Int. Cl.[7] ................................................. A47C 31/00
(52) U.S. Cl. ...................... 297/467; 297/250.1; 297/484
(58) Field of Search ........................... 297/250.1, 256.15, 297/467, 474, 484

(56) References Cited

U.S. PATENT DOCUMENTS

| | | | |
|---|---|---|---|
| 4,826,246 | * | 5/1989 | Meeker ............................ 297/256.15 |
| 4,858,997 | * | 8/1989 | Shubin ......................... 297/256.15 X |
| 5,286,090 | * | 2/1994 | Templin et al. ............... 297/250.1 X |
| 5,538,322 | * | 7/1996 | Cone et al. ....................... 297/256.15 |
| 5,779,319 | * | 7/1998 | Merrick ............................... 297/484 |
| 5,873,635 | * | 2/1999 | Merrick .......................... 297/250.1 X |
| 5,899,534 | * | 5/1999 | Gray ..................................... 297/484 |

* cited by examiner

Primary Examiner—Peter M. Cuomo
Assistant Examiner—Stephen Vu
(74) Attorney, Agent, or Firm—Woodard, Emhardt, Naughton Moriarty & McNett (57) ABSTRACT

A modular system that allows a child seat manufacturer to combine the installation of the crotch belt assembly and the shoulder belt adjuster assembly in one step, and which allows the child seat manufacturer to vary the type of components without having to alter the design of the child seat. A module for use with a child seat that has a shoulder harness, an interengageable combination of a tongue and seat belt buckle, and has a seat portion that has been adapted to receive the module. The module, itself, has a pan that is mountable within the seat portion of the child seat, a belt retractor fixedly attached to the bottom of the pan, and a crotch assembly that is designed to attach either to the buckle or the tongue of the seat belt harness.

6 Claims, 14 Drawing Sheets

UNIVERSAL MOUNTING PAN FOR CHILD SEAT

This invention relates to a modular system to install various crotch belt assemblies and/or shoulder belt retractor assemblies into a given type of child seat. More particularly this invention relates to a universal mounting pan to which various crotch belt assemblies and/or shoulder belt retractor assemblies are attached, which can then be mounted in a given child seat that has been adapted to receive the mounting pan.

BACKGROUND OF THE INVENTION

In currently available child seats, the restraint system is comprised of three subassemblies: the shoulder belt assembly, the crotch belt assembly, and the shoulder belt adjuster assembly. These three subassemblies are shipped to and installed by the child seat manufacturer independently from one another, and the child seat manufacturer must make provisions for the attachment of each assembly to the child seat. As various restraint component options are considered, the child seat manufacturer must make changes to these attachment provisions to insure that new component configurations are compatible with the child seat. As the number of component options increases, the ability to mate all variations with a single child seat reaches a practical limit.

What is needed is a modular system, which allows the child seat manufacturer to combine the installation of several of these subassemblies without the need for changes to the child seat. This invention is one answer to that need.

SUMMARY OF THE INVENTION

In one aspect, this invention is a module for use with a child seat that has a shoulder harness, an interengageable combination of a tongue and seat belt buckle, and has a seat portion that has been adapted to receive the module. The module, itself, has a pan that is mountable within the seat portion of the child seat, a belt retractor fixedly attached to the bottom of the pan, and a crotch assembly that may be attached to either the buckle or the tongue of the seat belt harness.

In another aspect, this invention is a child seat harness for installation in an automobile. The child seat harness includes a child seat that is adapted to receive a module in its seat area, a harness mounted to the child seat, which is extendable over the child to secure the child within the child seat, an interlocking tongue and seat belt buckle mounted to said child seat, which is interlockable with the harness, and a universal module. The universal module includes a pan that is mountable within the seat of the child seat, a belt retractor that is attached to the pan; and a crotch assembly that is attached to either the tongue or the buckle of the harness.

An advantage of this invention is that it simplifies the installation of a restraint into a child seat.

Another advantage of this invention is that it allows child seat manufacturers to make a single provision in all models of its child seats for installation of the restraining harness, regardless of the configuration of the particular components, i.e. the crotch belt assembly or the belt retractor assembly or the means for controlling the belt retractor assembly.

DESCRIPTION OF THE PREFERRED EMBODIMENTS

For the purpose of promoting an understanding of the principles of this invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein are contemplated as would normally occur to one of average skill in the art to which the invention relates.

Figure 1:
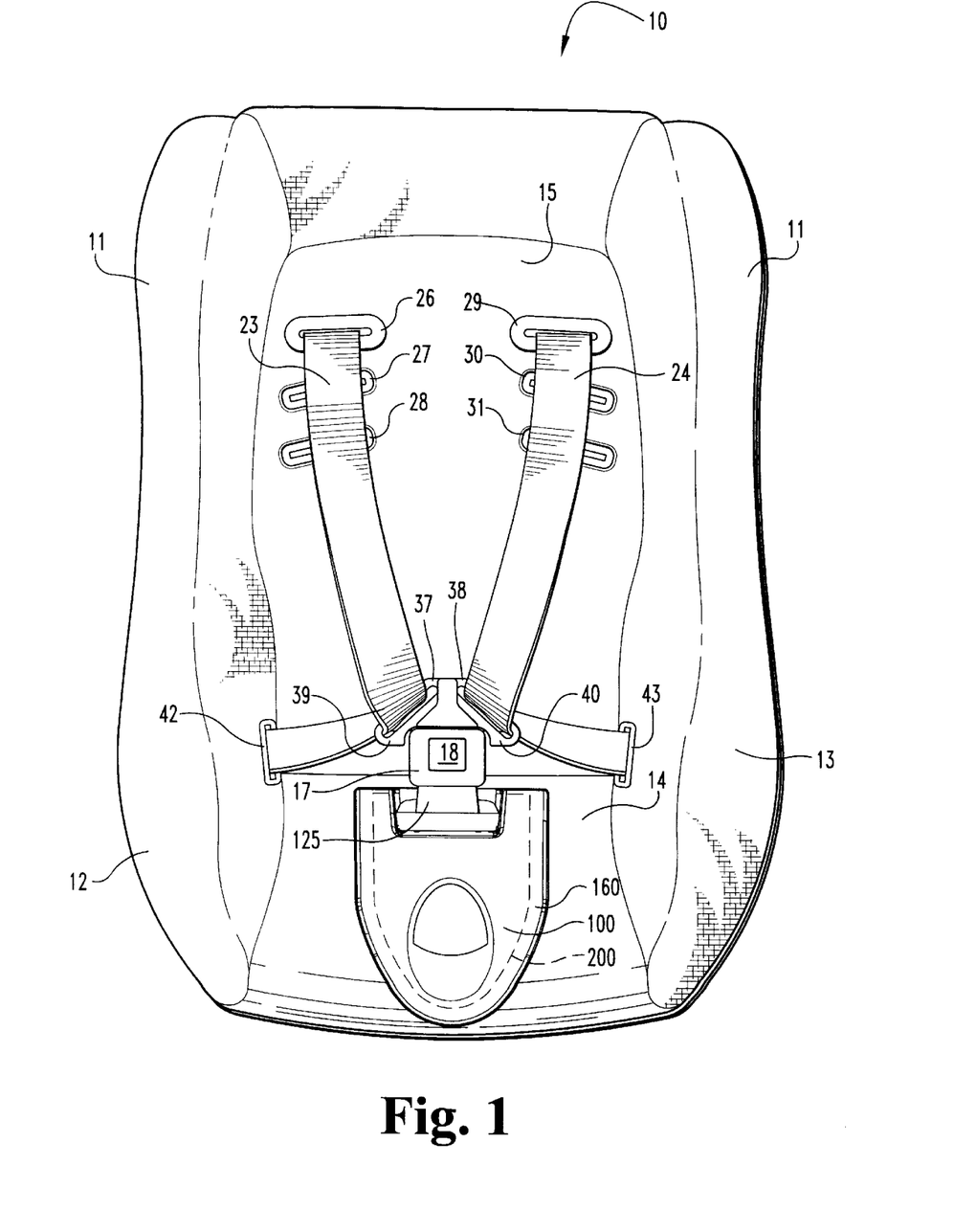
FIG. 1 is a front view of a child seat incorporating one alternative embodiment of the modular system according to the invention disclosed in this specification.

Referring now to the drawings, in FIG. 1 there is shown a child seat 10, which includes an outer frame 11 having a pair of downwardly extending arms 12 and 13 with a seat area 14 and a back supporting area 15 located therebetween. A plurality of conventional tubing 35 (FIG. 2) forms a rear frame 36. Tubing 35 may be utilized to secure child seat 10 to an automobile seat by any suitable means such as by extending the automobile seat belts securely around tubing 35. In the seat area 14, there is provided a seat belt buckle 17. In back supporting area 15 there is provided a first set of slots 26–28 and a second set of slots 29–31. Belts 23 and 24 have ends 8 and 9 (FIG. 2) secured to conventional T-bar or belt connector 25 with the belts then extending each through a slot formed in back supporting area 15. In the embodiment shown in FIG. 1, belts 23 and 24 extend slidably through slots 26 and 29 which are arranged to accommodate a large size child as compared to accommodating a smaller sized child when the belts extend through slots 28 and 31.

Belts 23 and 24 extend slidably respectively through slots 37 and 38 of tongues 39 and 40, which having tongued blades are releasably lockable with buckle 17. Tongues 39 and 40 are identical to the buckle tongues disclosed in the commonly owned U.S. Pat. Nos. 5,023,981 or 5,182,837 or D364124. Likewise, buckle 17 is identical to the buckle disclosed in the commonly owned U.S. Pat. Nos. 5,023,981 or 5,182,837 or D364124, which are hereby specifically incorporated into this specification by reference. Buckle 17 is provided with a push button 18 to allow the user to unlock the buckle relative to tongues 39 and 40. Once belts 23 and 24 extend through slots 37 and 38, the belts 23 and 24 then diverge and extend through a pair of apertures 42 and 43 formed in the sides of arms 12 and 13. Belts 23 and 24 are integrally joined together by intermediate portion 20 (FIG. 2) which extends across the bottom of the seat. Thusly configured, belts 23 and 24 are joined together in a single belt configuration. Belts 23 and 24 extend across the bottom of the seat, pass through apertures 42 and 43, pass through slots 37 and 38 of tongues 39 and 40, and then pass through the pair of slots 26 and 29. Belts 23 and 24 connect to belt connector 25, in such a fashion to allow the belts to be removed from the belt connector in the event the belts are to be changed and extended through either slots 27 and 30 or slots 28 and 31.

Figure 2:
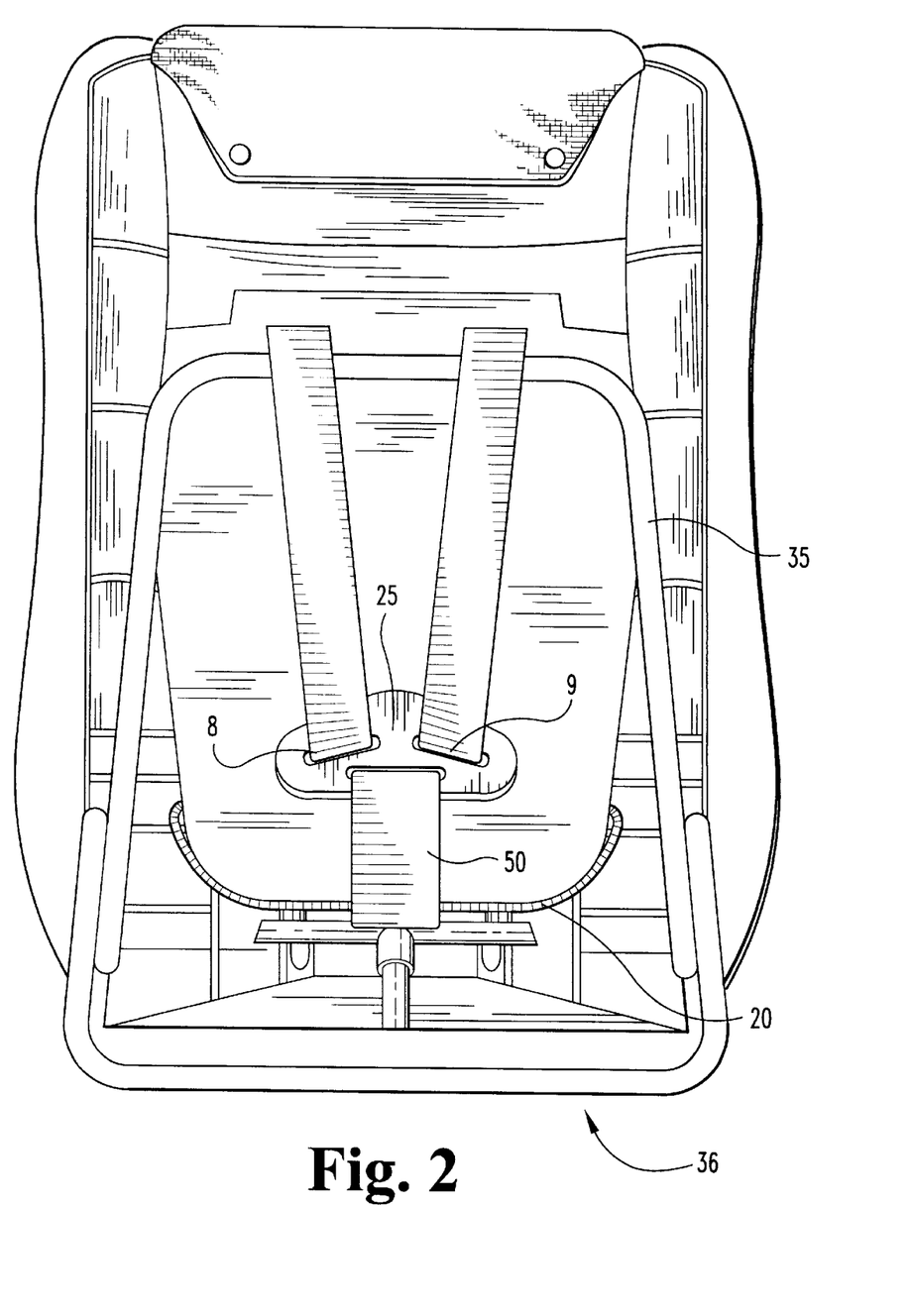
FIG. 2 is a rear view of the seat of FIG. 1.
Figure 3:
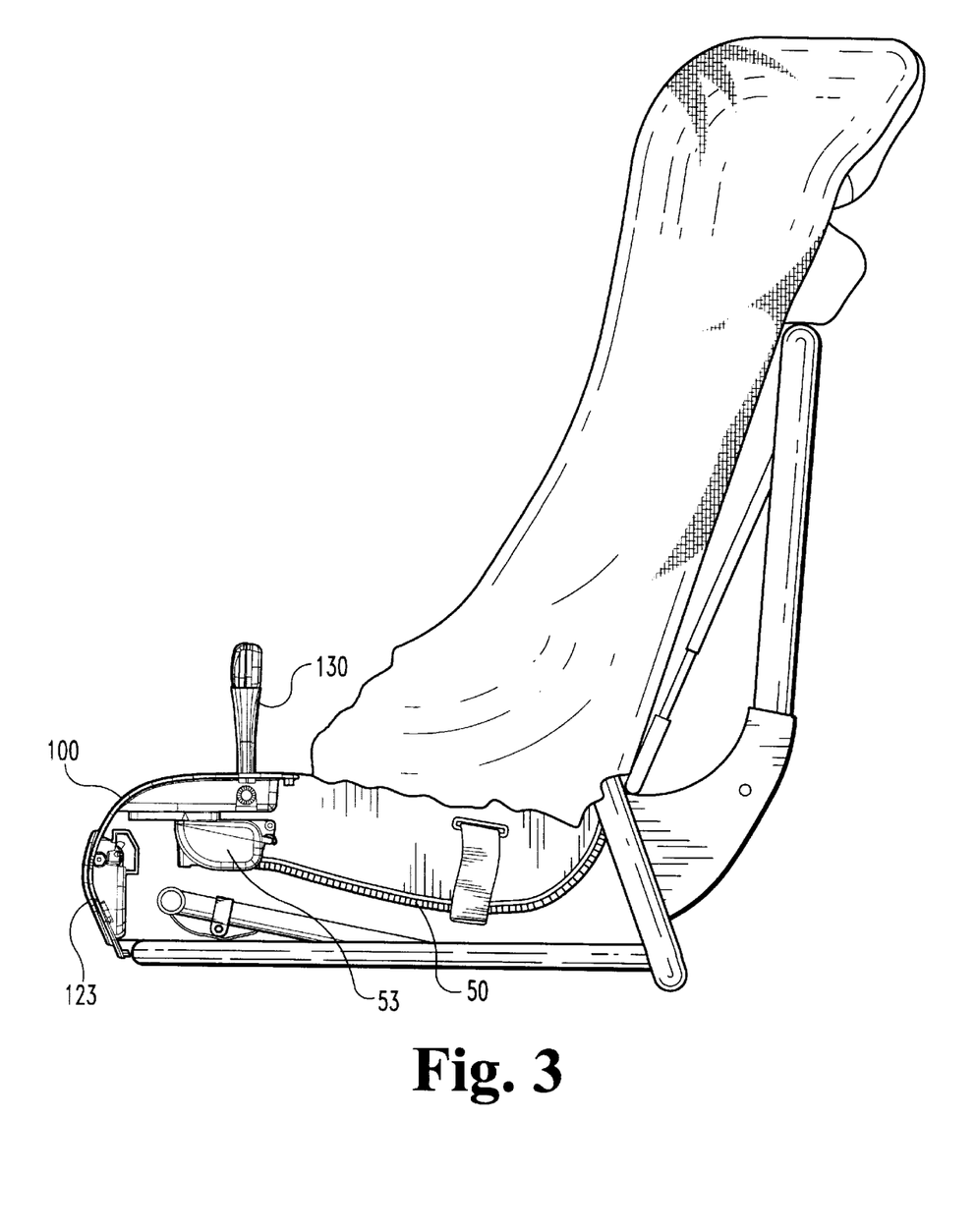
FIG. 3 is a fragmentary view left side view of a child seat incorporating one alternative embodiment of the modular system according to the invention disclosed in this specification.

Referring now to FIGS. 2 and 3, a third belt 50 has a distal end 51 fixedly secured to belt connector 25, with the proximal end of belt 50 being wrappingly mounted onto belt retractor 53. The belt-buckle-retractor system and the child seat as described so far are presently conventional and are currently available in the marketplace from a variety of sources. The present invention is the inclusion of such belt-buckle-retractor systems in a module that can be interchanged from one model of a child seat to another model of a child seat. Referring now to FIG. 1, child seat 10 also includes mounting pan 100. Pan 100 is the basis of the present invention for a modular system that allows a child seat manufacturer to combine the installation of several components of the child restraint system in one step, rather than multiple steps. This, in turn, allows the child seat manufacturer to vary component options without having to make changes in the child seat.

Figure 4:
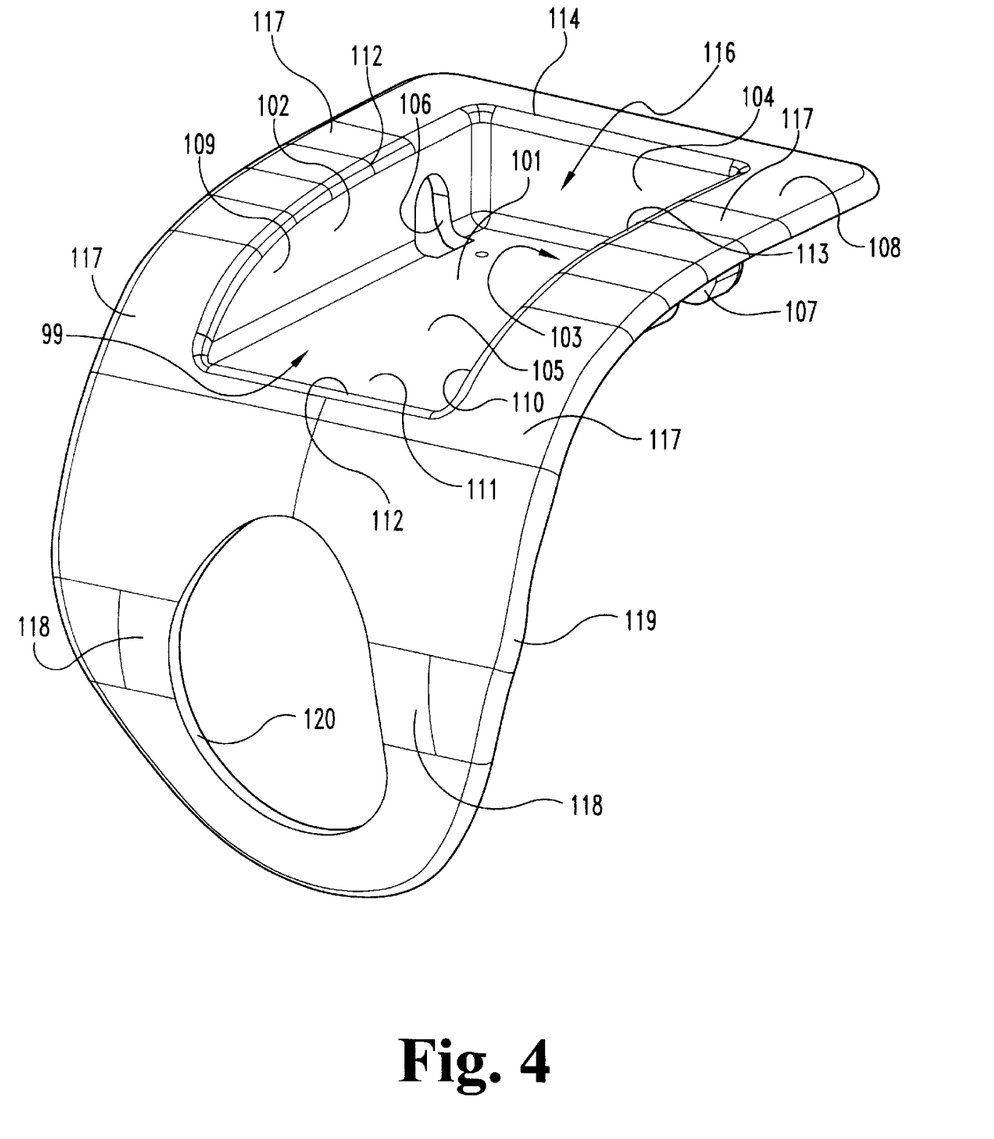
FIG. 4 is an enlarged perspective view of one alternative embodiment of the pan used in the modular system according to the invention disclosed in this specification.
Figure 5:
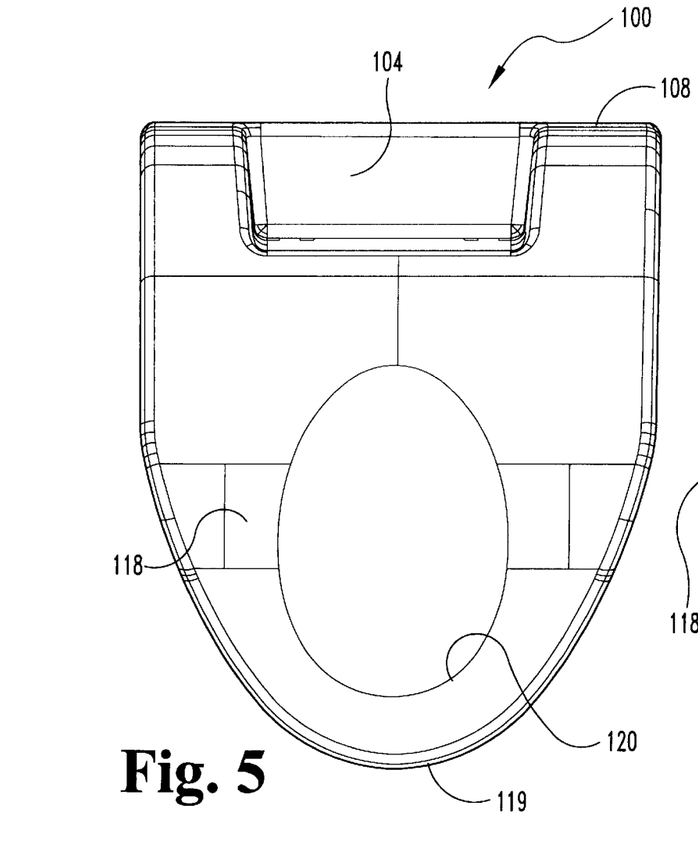
FIG. 5 is a front view of the pan of FIG. 4.
Figure 6:
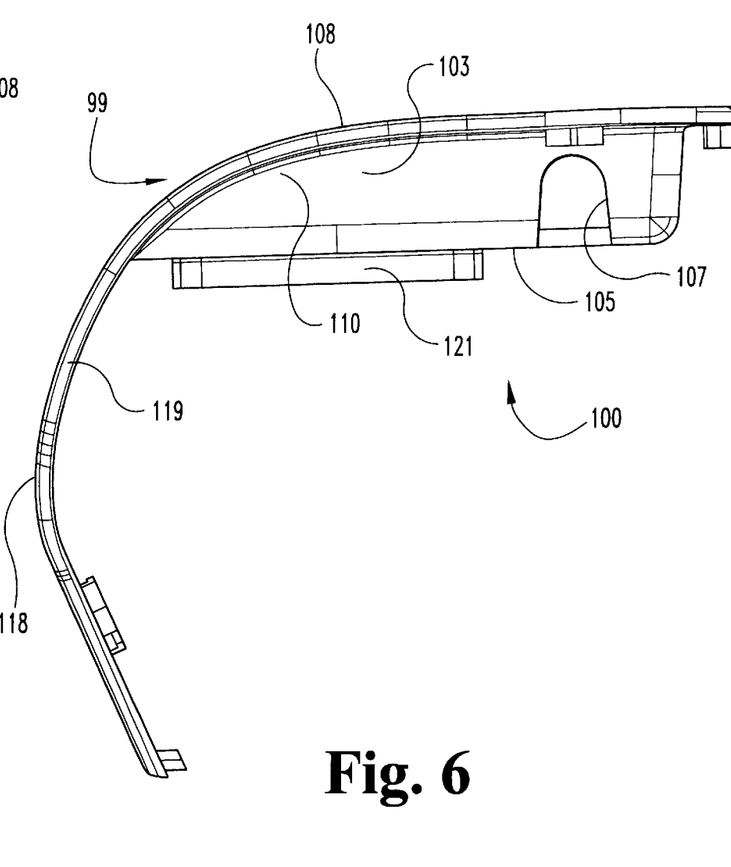
FIG. 6 is a side view of the pan of FIG. 4.

An isolated perspective view of pan 100 is shown in FIG. 4, of which a front and a side view are respectively shown in FIGS. 5 and 6. Pan 100 has a channel 101 defined by sides 102 and 103, wall 104, floor 105, and open end 99. Openings 106 and 107 reside in sides 102 and 103, and as shown, may also include a portion of floor 105. The upper edges of side 102, side 103, and wall 104 are fixedly attached to the internal edges, respectively 112, 113, and 114, of base 108 that surrounds channel 101. The upper edges of channel 101 at the distal ends 109 and 110 of its sides 102 and 103 are tapered to meet floor 105. Base 108 is similarly attached to the upper edges of distal ends 109 and 110 as base 108 is attached to the rest of sides 102 and 103. So being, base 108 follows the tapers in distal ends 109 and 110, curves around open end 99, and is then fixedly attached to distal end 111 of floor 105 at internal edge 115 of base 108. As a result, channel 101 generally forms a compartment 116 in top face 117 of base 108.

Besides top face 117, pan 100 also preferably includes a front face 118. Front face 118 is formed from base 108 by continuing base 108 down past compartment 116, in a fashion that preferably complements the curve in child seat 10 in which it is to be placed. Front face 118 creates additional surface area in base 108, which increases the length of external edge 119 of base 108. A pan 100 with a larger external edge 119 may be easier for some child manufacturers to mount into their child seat. But besides possibly assisting installation, front face 118 also provides a location where the practitioner of this invention may mount controls or options for the operation of the child seat. Accordingly, it is preferable that front face 118 in pan 100 also has one or more hole(s) 120 in which to mount such options or controls, as the need may arise.

Figure 7:
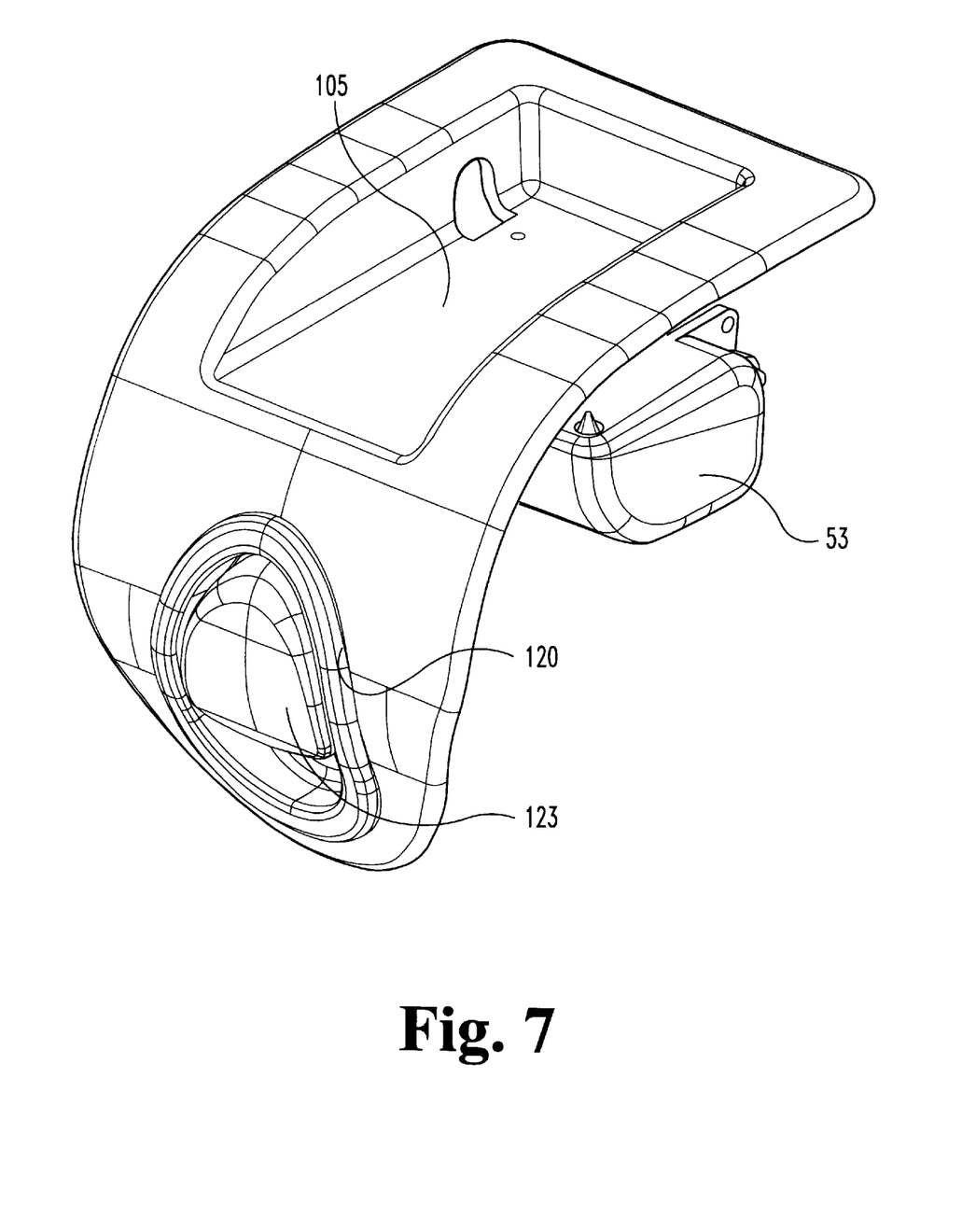
FIG. 7 is an enlarged perspective view of one alternative embodiment of the pan used in the modular system according to the invention disclosed in this specification that includes a belt retractor and a push button to operate the belt retractor.
Figure 8:
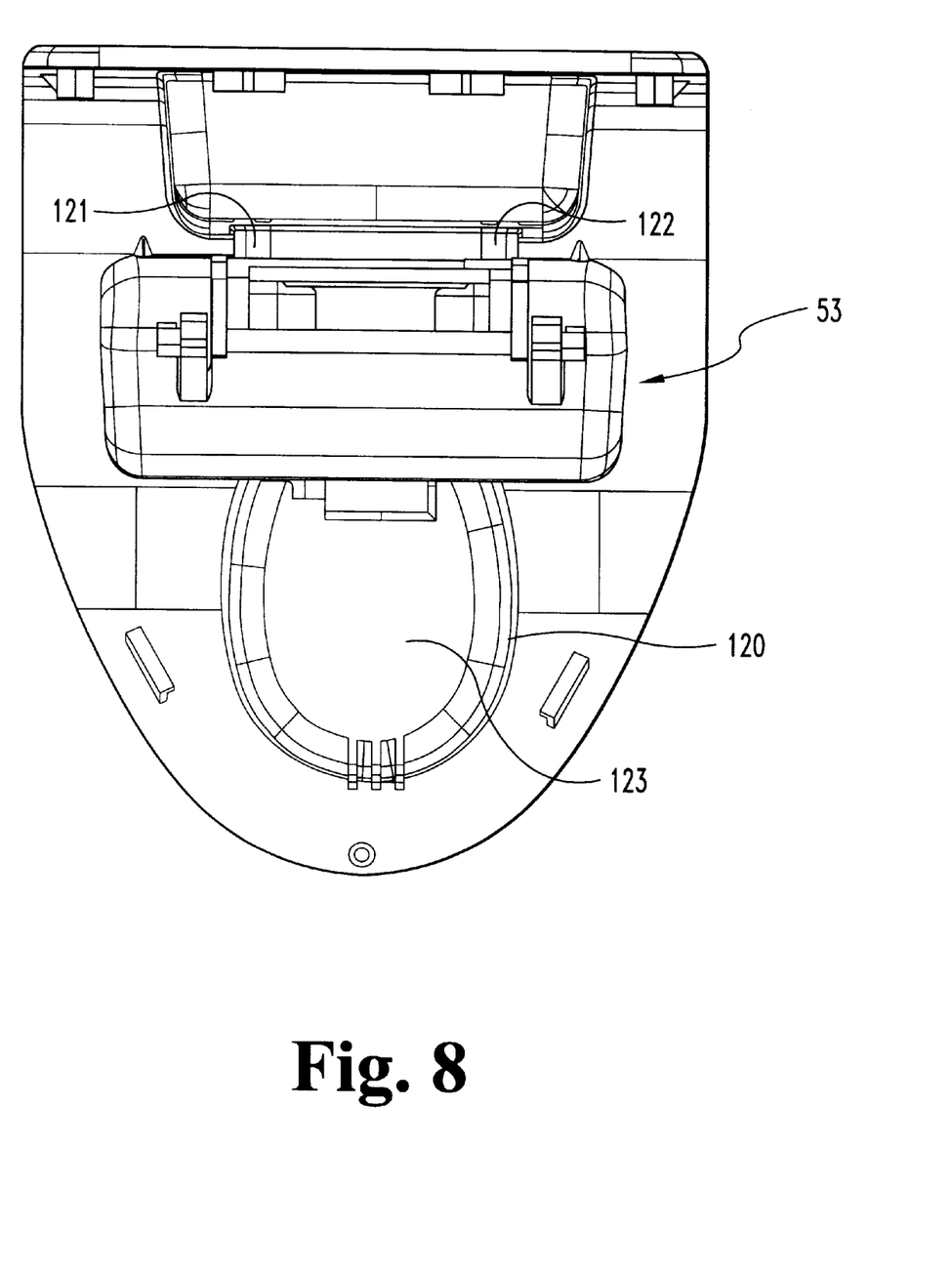
FIG. 8 is a rear view of the pan of FIG. 7.
Figure 9:
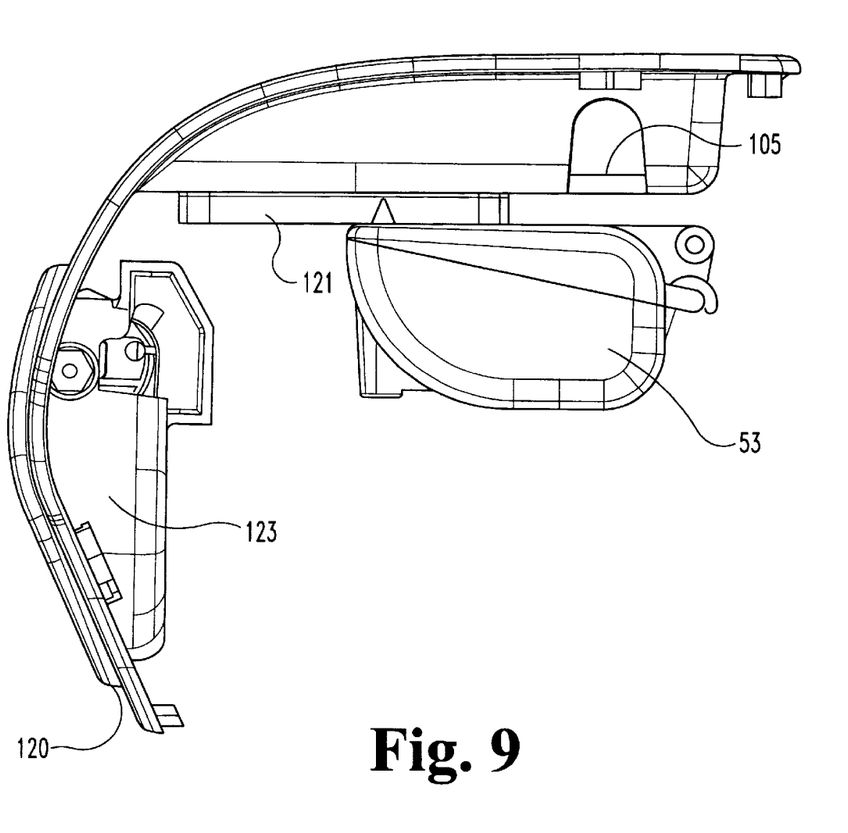
FIG. 9 is a side view of the pan of FIG. 7.

An isolated perspective view of one preferred embodiment of pan 100 is shown in FIG. 7, of which a front and a side view are respectively shown in FIGS. 8 and 9. In this embodiment, conventional belt retractor 53 is mounted to the bottom of pan 100, underneath compartment 116, and optionally over reinforcing members 121 and 122 that reinforce floor 105. A belt 50 (not shown in this figure) is wrappingly attached to belt retractor 53 as previously presented. A push button 123 is mounted in hole 120 of pan 100 to operate belt retractor 53. In one method of operation, conventional retractor 53 is normally locked to prevent both tightening and lengthening of belt 50. To place a child in seat 10, push button 123 is actuated to extract belt 50 and lengthen straps 23 and 24. Button 123 is then released while the child is secured, and once secured, button 123 is again actuated so that belt retractor 53 can remove any excess webbing in the system. In a second method of operation, conventional retractor 53 is normally locked to prevent lengthening of belt 50. To place a child in the seat, push button 123 is actuated to extract belt 50 and lengthen straps 23 and 24. Button 123 is then again released while the child is secured, but once secured, belt retractor 53 removes any excess in the system automatically without pushing button 123. An example of this type of control of a belt retractor can be found in commonly owned U.S. Pat. No. 5,380,066 to Wiseman et al., the disclosure of which is specifically incorporated into this specification by reference.

Figure 14:
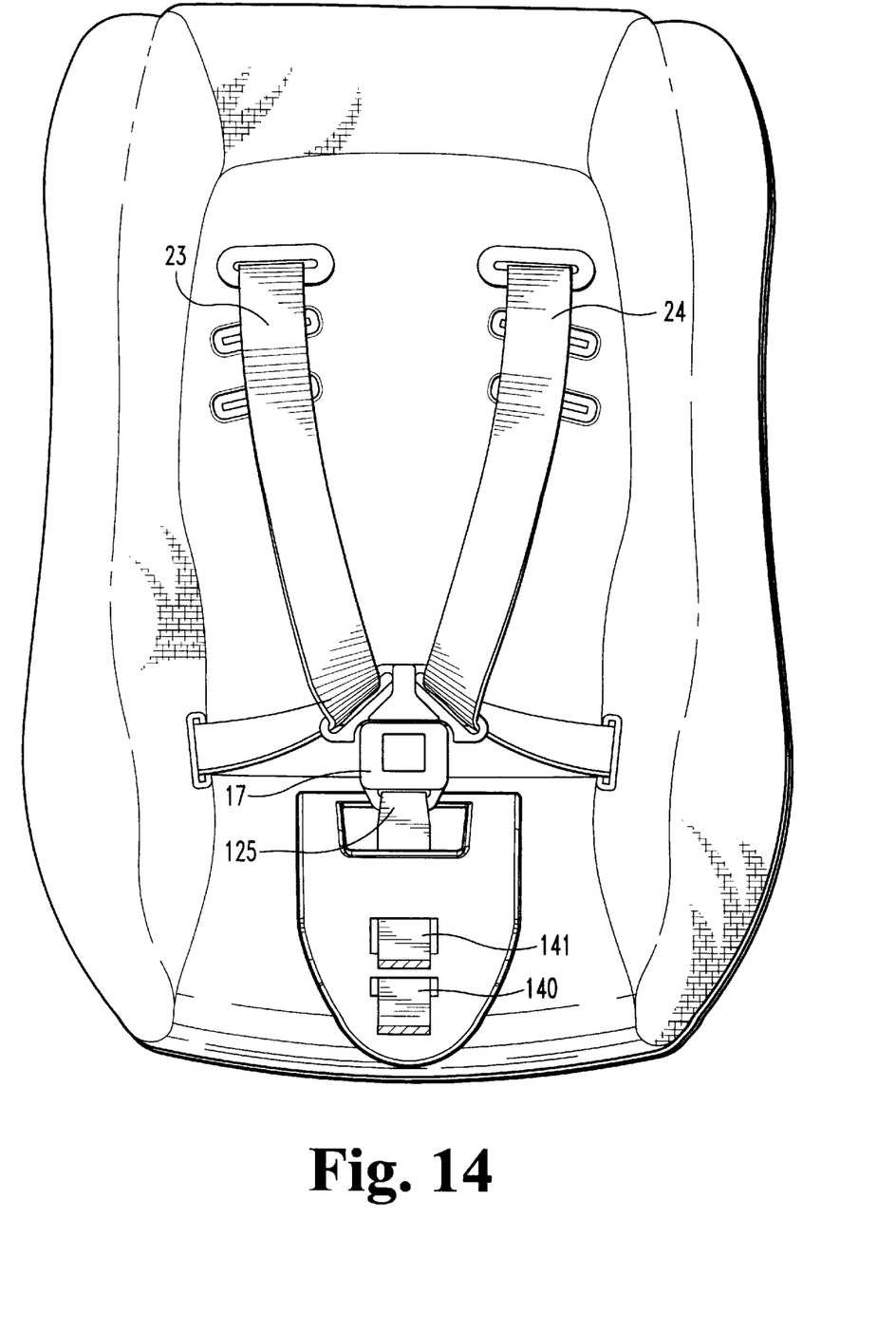
FIG. 14 is a front view of a child seat incorporating one alternative embodiment of the modular system according to the invention disclosed in this specification.

Besides push button 123, other means for actuating retractor 53 are contemplated by this invention. For example, pan 100 may include a rotary knob, a lever, or a strap 140 (FIG. 14) that is mechanically connected to retractor 53. Or the actuation means may be more complex such as actuation caused by the insertion of the blades of tongues 39 and 40 into buckle 17. An example of this latter type of control can be found in commonly owned U.S. Pat. No. 5,511,856 to Merrick et al., the disclosure of which is specifically incorporated into this specification by reference. Or retractor 53 may be operated by the movement of a rigid or semi-rigid stalk that is pivotally mounted in pan 100, in a position that would reside between the child's legs upon securing pan 100 in child seat 10.

In FIG. 1, buckle 17 is shown mounted at the distal end of a conventional webbing strap 125. The proximal end of webbing strap 125 is then pivotally secured around a transverse pin (not shown) that runs both through pan 100 at openings 106 and 107, and optionally through the metal frame of child seat 10. But something more than a conventional webbing strap, shown in FIG. 1, can be used to secure buckle 17 to pan 100.

Figure 10:
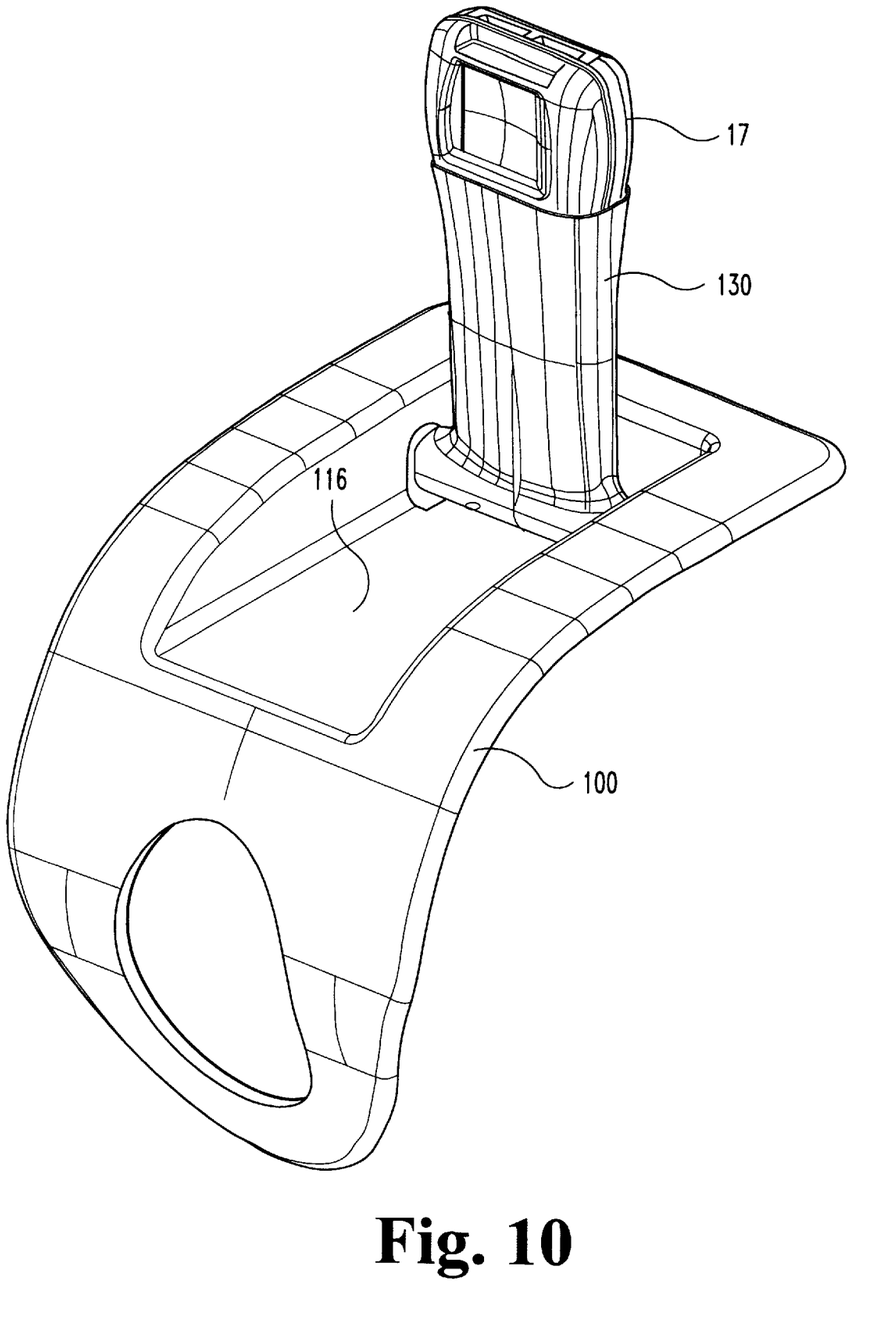
FIG. 10 is an enlarged perspective view of one alternative embodiment of the pan used in the modular system according to the invention disclosed in this specification that includes a crotch stalk.
Figure 11:
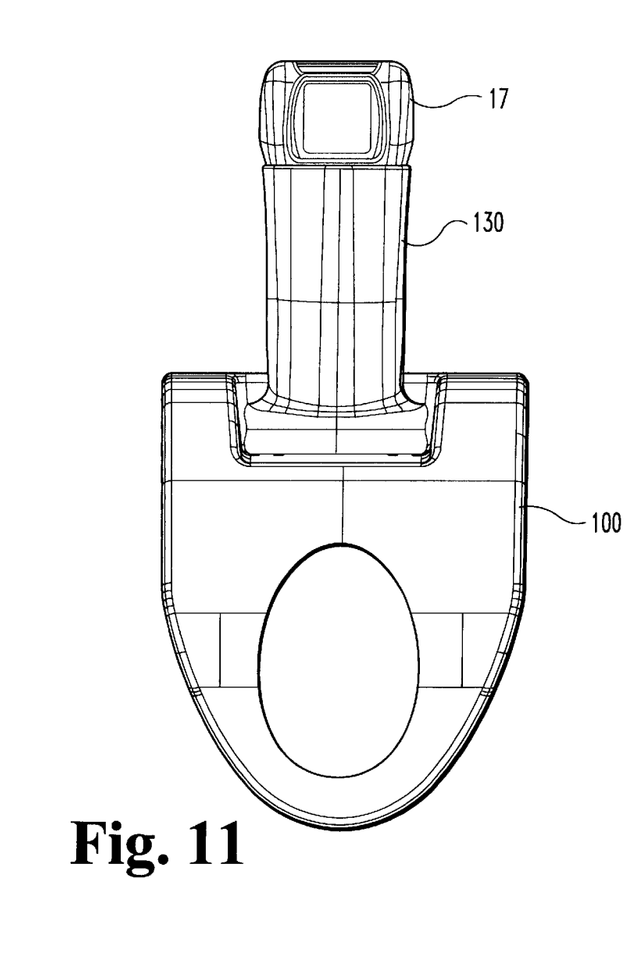
FIG. 11 is a front view of the pan of FIG. 10.
Figure 12:
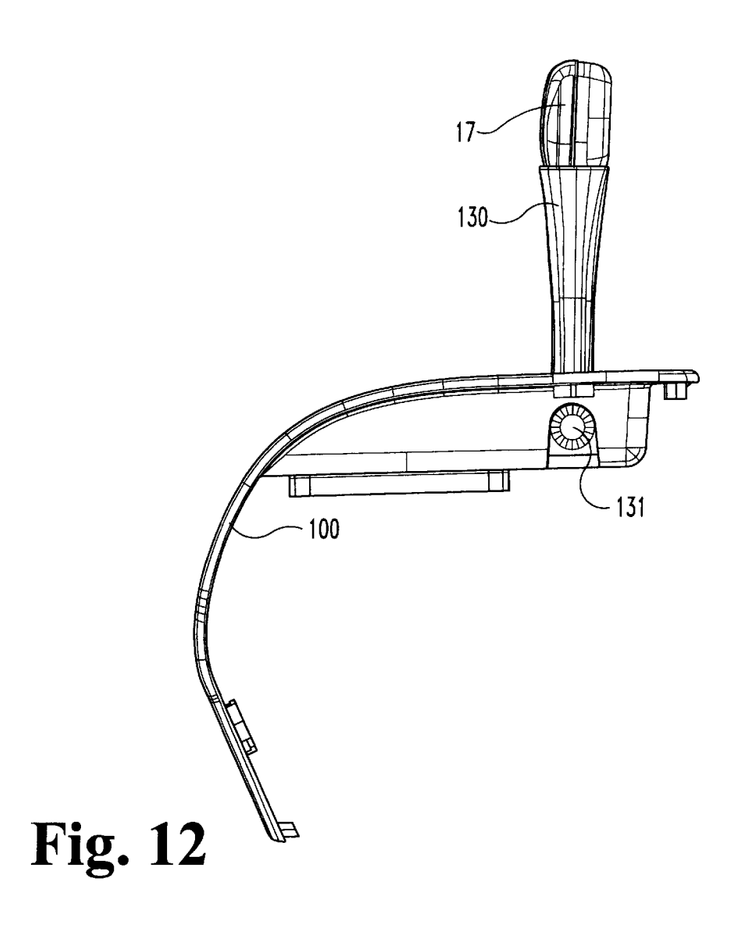
FIG. 12 is a side view of the pan of FIG. 10.

An isolated perspective view of another embodiment of this invention is shown in FIG. 10, of which a front and a side view are respectively shown in FIGS. 11 and 12, and a cross-sectional view is shown in FIG. 3. In this embodiment, a crotch stalk 130 is positioned within pan 100 and cooperates with tongues 39 and 40, as well as, the rest of the harness system shown in FIG. 1 to restrain the child in the child seat. Buckle 17 is fixedly secured to the distal end of crotch stalk 130. The proximal end of crotch stalk 130 is pivotally mounted by pin 131, which passes through openings 106 and 107 in pan 100, and optionally passes through the frame of the child seat. In one embodiment, the proximal end or lower portion of crotch stalk 130 extends below pivot pin 131 and mechanically engages retractor 53. (FIG. 3) When crotch stalk 130 is pivoted forward, belt retractor 53 is unlocked, which allows straps 23 and 24 to lengthen or tighten as previously described in regard to push button 123. An example of controlling a belt retractor with a pivotal stalk can be found in commonly owned U.S. Pat. No. 5,779,319 to Merrick, the disclosure of which is specifically incorporated into this specification by reference. An advantage of this particular design is that when the seat is not in use, it is contemplated that crotch stalk 130 can be positioned fully forward, within compartment 116, to facilitate storage.

Figure 13:
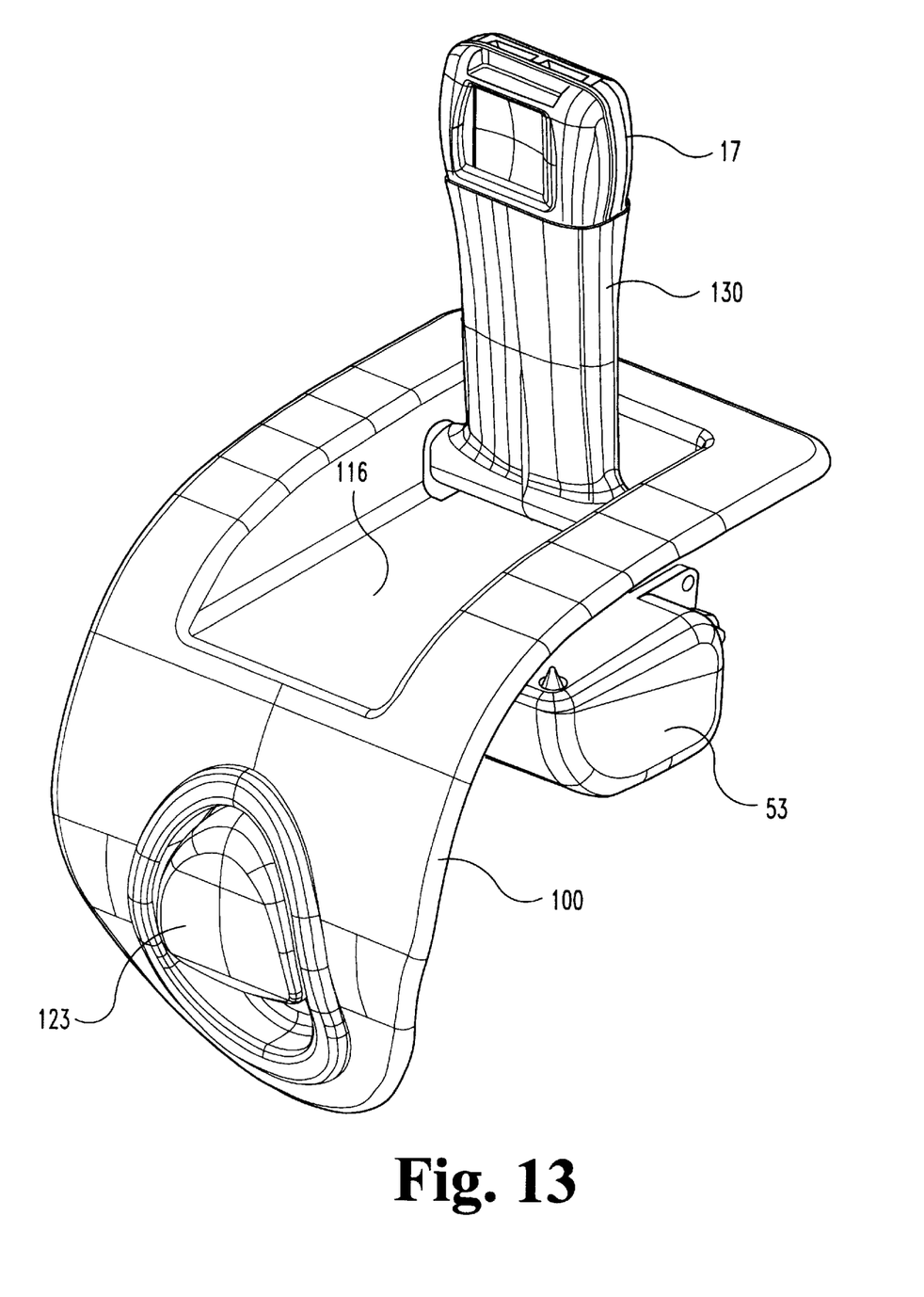
FIG. 13 is an enlarged perspective view of one alternative embodiment of the pan used in the modular system according to the invention disclosed in this specification that includes a crotch stalk, a push button, and a belt retractor.

Another embodiment of this arrangement is shown in FIG. 13. In FIG. 13, crotch stalk 130 is present, but another means is used to control belt adjuster 53, such as previously described pushbutton 123. In this arrangement, stalk 130 may be either pivotally secured or fixedly secured in the upright position to pan 100.

Optionally, pan 100 can also include an adjustable webbing lock 141 (FIG. 14) operably coupled to straps 23 and 24 as shown in commonly owned U.S. Pat. No. 5,286,090 to Templin et al., the disclosure of which is specifically incorporated into this specification by reference. An adjustable webbing lock placed in one or both of these locations can provide additional means to control the tightness of the harness around the child. Likewise, webbing strap 125 may be mounted to the front of the child seat frictionally engaging strap 125 to tighten or loosen 125.

Figure 15:
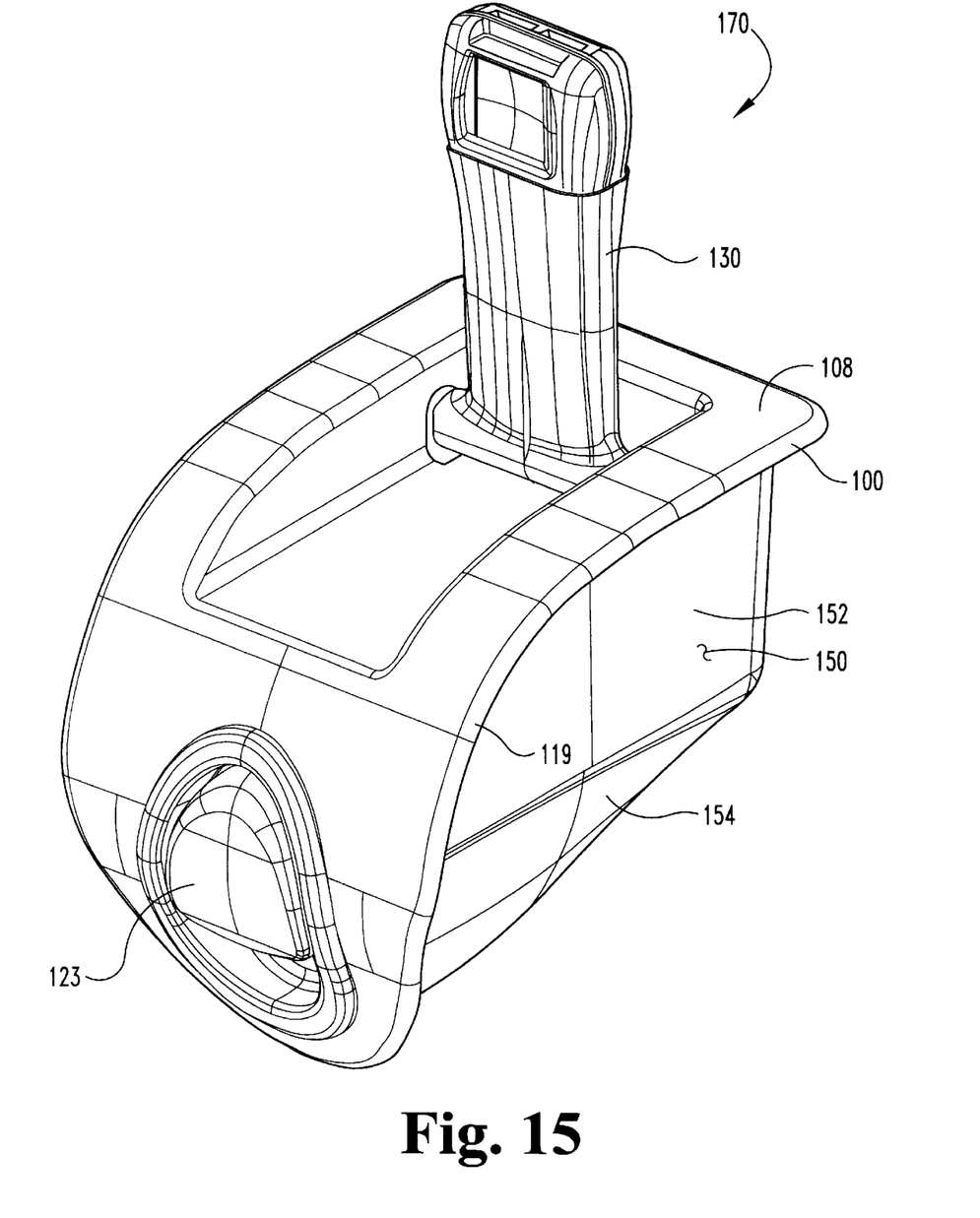
FIG. 15 is an enlarged perspective view of one alternative embodiment of a modular system according to the invention disclosed in this specification.
Figure 16:
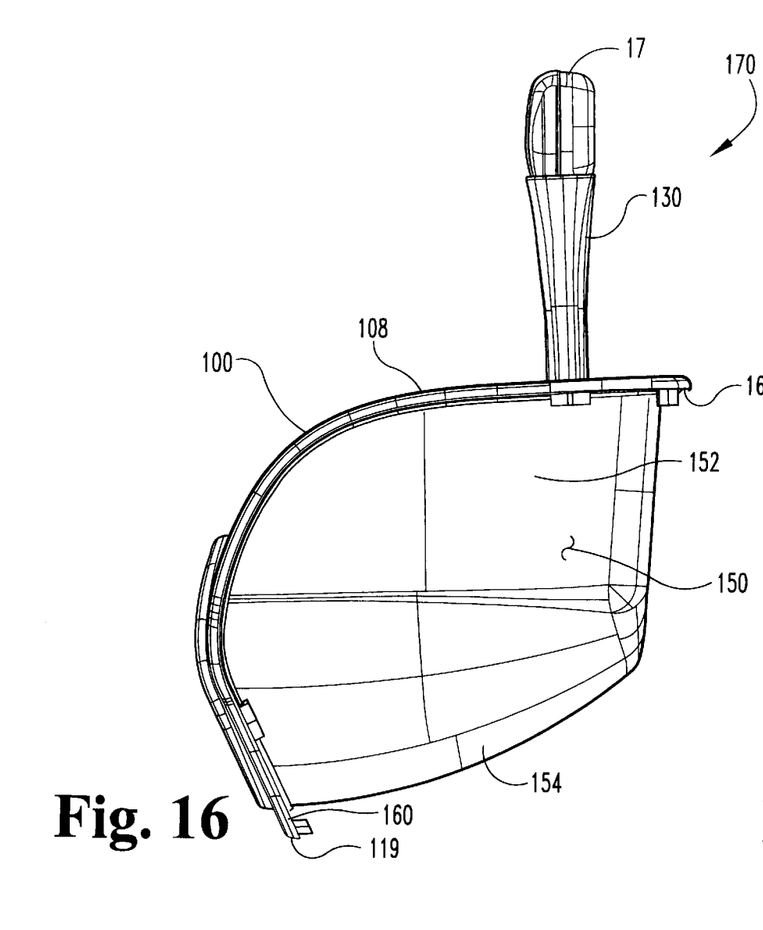
FIG. 16 is a side view of FIG. 15.
Figure 17:
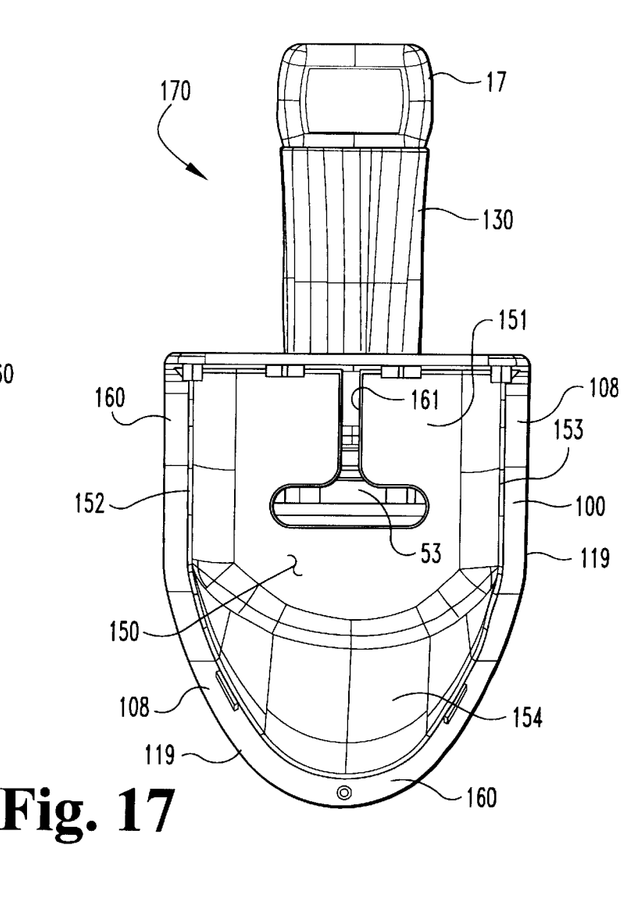
FIG. 17 is a rear view of FIG. 15.

An isolated perspective view of one preferred embodiment of pan 100 is shown in FIG. 15, of which a side and a rear view are respectively shown in FIGS. 16 and 17. In this embodiment, mounting pan 100 is combined with button 123, crotch stalk 130, and belt retractor 53 under cover 150. Cover 150 has a back 151, cover sides 152 and 153, and an elliptically shaped bottom 154. Cover 150 further includes an inverted tee-slot 161 in back 152. Tee-slot 161 is of a size and shape to allow the passage of third belt 50 (not shown in this figure) and to belt retractor 53. Cover 150 is joined to the underside of pan 100 along the distal edges of sides 152 and 153, and bottom 154. The distal edges of sides 152 and 153, and bottom 154 attach to base 108 inside external edge 119 of pan 100, creating flange 160 between cover 150 and outside edge 119 of pan 100.

Typically, module 170 is installed in a child seat 10 that has been pre-configured to accept module 170. For example, in one installation arrangement, seat portion 14 (FIG. 1) of child seat 10 has a cavity 200 with a shape that is complementary to the external dimensions of cover 150, but not large enough to pass base 108. Module 170 is then placed into cavity 200, leaving flange 160 riding over the top of seat portion 14. But in this regard, it is preferable for seat portion 14 to also have a mating flange (not shown) that is cut into the outside surface of seat portion 14 in the location where flange 160 makes contact with seat portion 14. Such a mating flange will place the inside face of flange 106 below the face of seat portion 14, and when the mating flange is sufficiently below the face of seat portion 14, will also allow the outside surface of pan 100 to reside flush with seat portion 14. Once in place, module 170 can then be attached to child seat 10 in most any conventional manner such as with screws, snaps, rivets, or the like.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A child seat harness for installation in an automobile, said harness comprising:

a child seat configured to receive a child, said child seat having a seat portion, said seat portion having a cavity therein;

a harness mounted to said child seat and extendable over the child to secure the child within said child seat, said harness having a first portion;

an interlocking tongue and seat belt buckle mounted to said child seat and interlockable with said harness;

a module, including a pan that is mountable within the cavity of said seat portion, said module including a belt retractor fixedly attached to said pan and wrappingly receiving said first portion of said harness; said module including a crotch assembly fixedly attached to said interlocking tongue and seat belt buckle and attached to said pan; and wherein said crotch assembly is pivotally attached to said pan.

2. The child seat of claim 1, wherein said pan includes a channel that is adapted to receive said crotch assembly.

3. The child seat of claim 1, wherein said pan includes a flange that is adapted to attached to said seat portion.

4. The child seat of claim 1, wherein said pan includes a base that is adapted to mount about flush with said seat portion.

5. The child seat of claim 1, including means to adjustably tighten said crotch assembly.

6. The child seat of claim 1, wherein said crotch assembly is a stalk that is pivotally mounted to said pan.

* * * * *